United States Patent [19]

Lowe

[11] 4,448,151

[45] May 15, 1984

[54] CAT BOX FILLER SYSTEM AND METHOD

[76] Inventor: Henry E. Lowe, 21725 Allegheny St., Cassopolis, Mich. 49031

[21] Appl. No.: 132,285

[22] Filed: Mar. 20, 1980

[51] Int. Cl.³ .......................................... A01K 1/015
[52] U.S. Cl. ..................................................... 119/1
[58] Field of Search ............................. 119/1; 206/525

[56] References Cited

U.S. PATENT DOCUMENTS

| | | | |
|---|---|---|---|
| 3,154,052 | 10/1964 | Sweeney | 119/1 |
| 3,735,734 | 5/1973 | Pierce et al. | 119/1 |
| 3,745,975 | 7/1973 | Prucha | 119/1 |
| 3,886,901 | 6/1975 | Zeitter | 119/1 |
| 3,983,842 | 10/1976 | Marion et al. | 119/1 |

Primary Examiner—Hugh R. Chamblee
Attorney, Agent, or Firm—Marmaduke A. Hobbs

[57] ABSTRACT

A cat box filler system in which two layers of litter are provided in the container in which the material is shipped and sold. The container is provided with a place to be opened when the filler material is to be discharged in a cat box. The layer in the bottom or farthest from the opening in the container contains a substantial amount of odor suppressant and the other layer contains little or no odor suppressant. When the container is to be used the end of the container farthest from the layer with the odor suppressant is opened and the container is held with a hole at the bottom so that the first layer with little or no odor suppressant flows into the cat box, and the layer with the odor suppressant flows over the first layer, forming the top layer of the material in the cat box. The invention also includes the method involving the steps of emptying the container into the cat box to form two layers therein.

16 Claims, 6 Drawing Figures

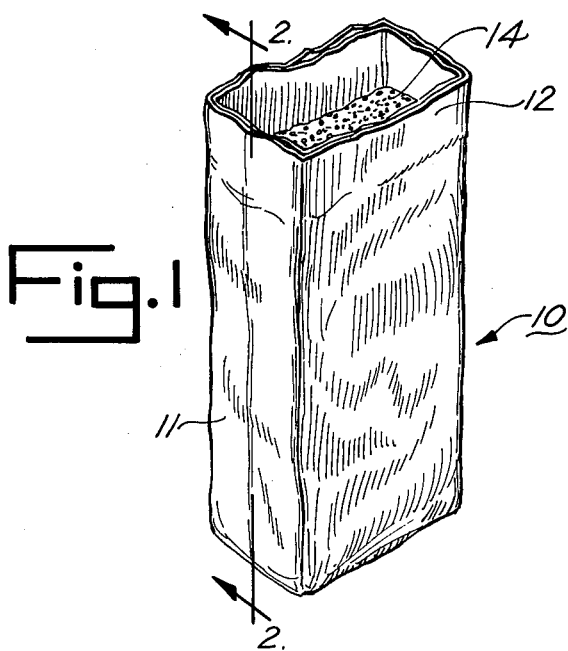
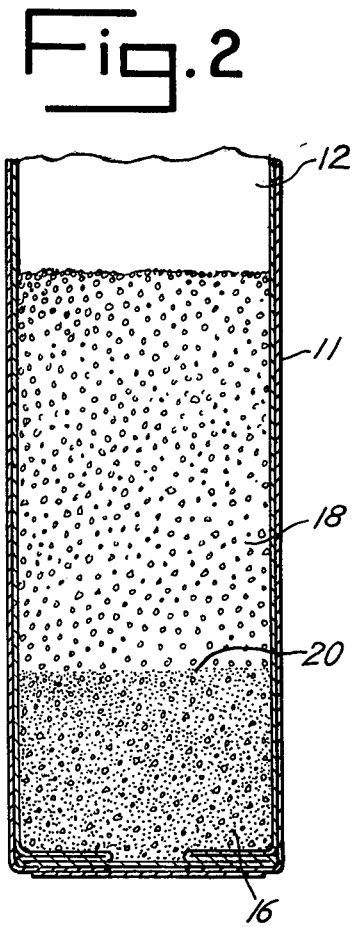
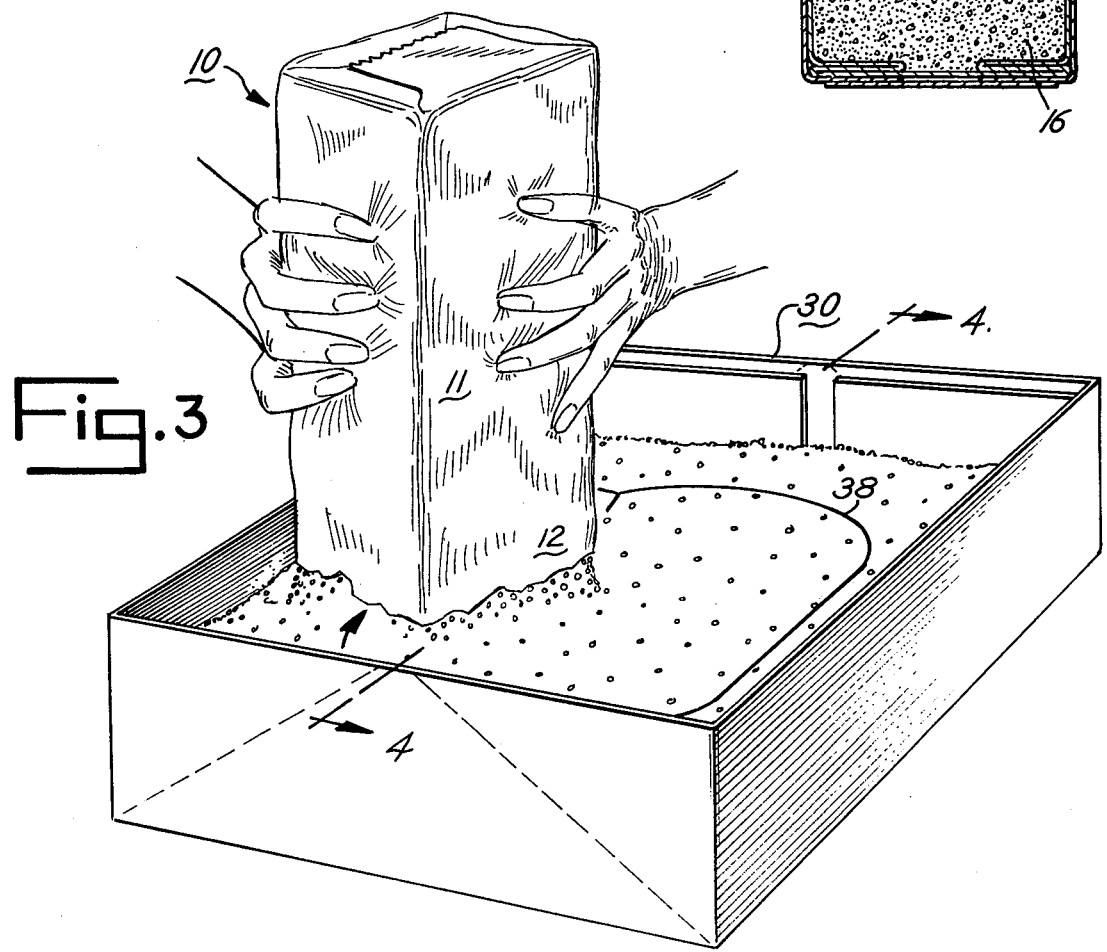

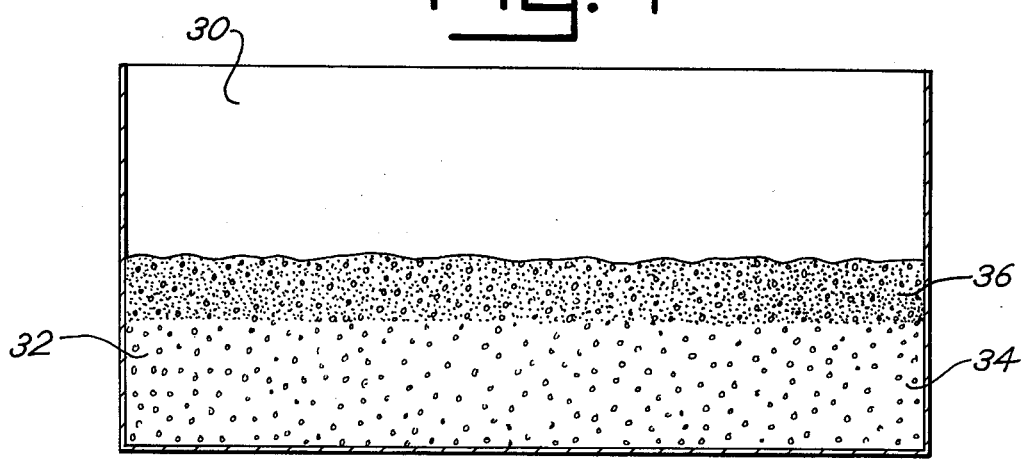
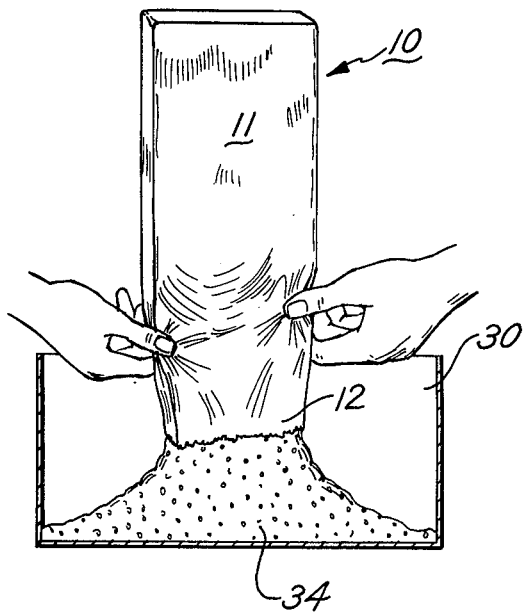
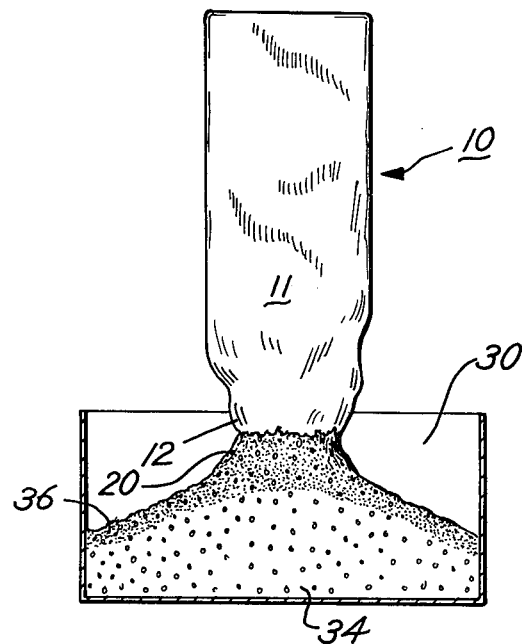

CAT BOX FILLER SYSTEM AND METHOD

One of the most difficult problems encountered in providing and maintaining litter boxes for cats to use indoors is the suppressing of the odor from the cat's waste. Various preparations are sold in small containers which can be used by adding it from time to time to the litter material in the box as the litter material is used by the cat. The practice is not only inconvenient but is also often messy and unpleasant and is difficult to perform to obtain distribution of the odor suppressant where it will be most effectively utilized. If the odor suppressant is carefully mixed with the litter to obtain good distribution, the separate suppressant can be effective; however, usually some portions of the litter receive an excessive amount of the suppressant, thus resulting in a waste of the relatively expensive preparation, and other portions receive amounts too small to be effective. Therefore, the use of a separate odor suppressant for addition to the litter material in the foregoing manner has not been generally accepted by cat owners. Another practice which has been successful in obtaining the desired suppression of the odor in the litter has been by mixing the suppressant fully with litter at the time the litter is prepared and packaged for distribution and sale. After using the litter in the box, the cat customarily covers the waste by scraping the litter over the waste, using its paw to move the litter in the close proximity of the waste. Since the cat usually uses the litter only close to the center of the box near the top of the litter, only a small portion of the litter is used by the cat, the litter in the bottom and along the periphery of the box often remaining relatively clean and free of odor causing waste. Since effective odor suppressants are generally rather expensive, the mixing of the suppressant with the litter before packaging unnecessarily increases the cost of the final material, in that a substantial amount of the litter material is never in contact with the cat's waste and hence performs no appreciable function in suppressing the odor at any time during the use of the litter material.

It is therefore one of the principal objects of the present invention to provide a package of cat box filler material which has a portion of the material treated with an odor suppressant and a portion either not treated with odor suppressant or treated with a lesser amount of odor suppressant than the first portion, so that, when the material is emptied from the package into the box, the portions form layers having the greatest amount of the odor suppressant treated material in the place where the cat most often uses the material in the box.

Another object of the invention is to provide a package of cat box filler material which contains a portion in one end of the container having an odor suppressant mixed therewith and a portion in the other end of the container having little or no odor suppressant therein, and which is vertically elongated and has a discharge opening in the end adjacent the material with little or no odor suppressant.

Still another object of the invention is to provide a package of the aforesaid type which is relatively simple to fill, ship and use, and which spreads the material when emptied to obtain the most advantageous use of the portion with the odor suppressant.

A further object of the invention is to provide a package for and method of creating multiple layers of material in a sanitary cat box, in which one of the layers has a relatively large amount of odor suppressant and another layer has relatively little or no odor suppressant, and in which the first layer is most concentrated at the place in the box which is used most often by the cat.

In the present invention, a bag contains a layer of cat litter with a relatively potent odor suppressant and a layer of litter with no, or relatively little, odor suppressant. The bag is opened at the end adjacent the latter layer and is inverted while the edges of the bag around the opening are held closed. The edges are then released, permitting the litter of the two layers to flow freely from the container into a cat box to form upper and lower layers, with the layer containing the odor suppressant forming the top layer in the box.

Additional objects and advantages of the present invention will become apparent from the following description and accompanying drawings, wherein:

FIG. 1 is a perspective view of a bag of cat box filler material, showing the bag in open position and the top of the filler material therein;

FIG. 2 is a vertical cross sectional view of the bag shown in FIG. 1, the section being taken on line 2—2 of the latter figure;

FIG. 3 is a perspective view of a sanitary cat box and the bag of FIGS. 1 and 2, illustrating the manner in which the material is poured from the bag to obtain satisfactory distribution of the filler material in the box;

FIG. 4 is a vertical cross sectional view of the cat box shown in FIG. 3, after the material has been poured therein;

FIG. 5 is a vertical cross sectional view of the cat box shown in the preceding figures and an elevational view of the bag of filler material being poured from the bag into the box during the initial stage of the filling operation; and FIG. 6 is a vertical cross sectional view of the cat box shown in the preceding figures and an elevational view of the bag, showing the filler material flowing from the bag in a later stage of the cat box filler operation.

Referring more specifically to the drawings, and in particular to FIGS. 1 and 2, numeral 10 indicates a package of cat box filler material, sometimes referred to as cat litter, consisting of a bag 11 with the upper end 12 thereof openable for pouring the material from the bag, the material being shown in the bag and indicated by numeral 14. The filler material 14 is in two layers, a lower layer 16 and an upper layer 18, the lower layer consisting of litter material treated with an odor suppressant, and the upper layer consisting of litter material without any odor suppressant, or with only a relatively small amount of odor suppressant.

The basic material of layers 16 and 18 may be the same, such as ground clay, the differences between the two layers consisting primarily of the presence or absence or the amount of an odor suppressant in the respective layers. The kind or type of odor suppressant may vary, depending upon the suitability of the material for minimizing the odor from the urine and feces deposited by the cat in the cat box. If desired, the two layers may both contain an odor suppressant, the odor suppressant in layer 16 normally being substantially more potent than the odor suppressant in layer 18, since layer 16 forms the top layer of the filler material after it has been added to the box, and hence acts to prevent the odor from the cat waste from permeating the air above the cat box. The two layers 16 and 18 are normally not separated from one another but merely form a line of contact indicated by numeral 20 as seen in FIG. 2.

While only two layers of the filler material are shown in the bag in the drawings, an additional layer may be used if desired, in which there may be gradation between the most potent odor suppressing material in the bottom and the least potent or none at all in the top layer, while the intermediate layer may have an odor suppressant in an amount between the amounts in the top and bottom layers. The litter material is normally sold in bags which are opened from the top; hoever, the invention applies equally to containers of the cardboard carton type and/or bags openable at the bottom, with the odor suppressant material being positioned at the top, i.e. farthest from the opening from which the material is poured, so that it is poured last from the container. In order to accomplish the effective distribution of the filler material in the box with the odor suppressant material on top, the layer with the most potent odor suppressant material is positioned furthest from the opening from which the material is poured into the box. If the container is so constructed that the normal opening is placed at the bottom of the container, whether it is a container or a bag, the layer with the most potent odor suppressant is positioned at the top, i.e. above the layer containing little or no odor suppressing material.

FIG. 3 illustrates the manner in which the filler material shown in FIG. 2 is poured from the bag into cat box 30 to form a bed of filler material in the box, with layer 34 being formed by layer 18 in the bag, and layer 36 being formed by layer 16 in the bag. When the box is relatively large, the distribution of the filler material can effectively be obtained by moving the bag in a circular motion while holding the bag in vertical inverted position, the circular movement being illustrated in FIG. 3 by arrow line 38 on the top of the filler material in box 30. Several revolutions of the bag in the box may be required to fully distribute the filler material in the box, with layer 16 of the bag being poured last and hence forming layer 36 in the box.

The steps by which the material is poured from the box are illustrated in the drawings, the first step consisting of opening the bag as seen in FIGS. 1 and 2. The portion of the bag around the opening is then grasped between the fingers to hold the bag closed until it has been fully inverted and preferably placed in vertical position with the opened end on the bottom of the empty cat box. The bag is then grasped between the hands as illustrated in FIG. 3 and lifted from the bottom, thus permitting the opened end to open fully and the filler material to flow from the bag, these steps being illustrated in FIGS. 5 and 6. The additional step of moving the bag in a circular motion may be performed while the bag is being lifted to provide the desired distribution throughout the box. However, it is preferred that the greatest amount of the material containing the odor suppressant be near the center of the box and the smallest amount in the corners.

While several modifications have been mentioned herein, other modifications may be made without departing from the scope of the invention.

I claim:

1. A package of cat box filler material, comprising a container having side walls and end walls, one of said walls being openable for discharging the material from the container, a first layer of litter material disposed adjacent said openable wall, a second layer of litter material with an odor suppressant mixed throughout in any amount substantially greater than any odor suppressant in said first layer, disposed in spaced relation to said openable wall with said first layer being disposed between said second layer and said openable wall so that when the two layers of litter are emptied from the container through the openable wall with the opened wall facing downwardly, two layers of litter are formed in the cat box with said second layer forming the top layer in the box.

2. A package of cat box filler material as defined in claim 1 in which said first layer is devoid of any added odor suppressant material.

3. A package of cat box filler material as defined in claim 1 in which said first layer of litter material forms approximately two thirds of the total amount of litter in the container and said second layer forms substantailly the remainder of the litter material in the container.

4. A package of cat box filler material, comprising a bag having an opening in the top for discharging litter material therefrom, a first layer of litter material containing an odor suppressant in the bottom of said bag, a second layer of litter material in said bag above said first mentioned layer and having substantially less odor suppressant than said first layer, walls at the top of said bag defining an opening and providing a means for holding the opening closed while said bag is being inverted to empty the litter material from the bag through said opening to form two layers of litter in the cat box, with the layer containing the odor suppressant forming the top layer in the box.

5. A package of cat box filler material as defined in claim 4 in which said second mentioned layer of litter material is devoid of any added odor suppressant.

6. A package of cat box filler material as defined in claim 4 in which said first mentioned layer of litter material constitutes approximately one third of the total material in the bag.

7. A method of filling a cat box with litter, comprising forming upper and lower layers of litter in a container with the upper layer containing an odor suppressant in an amount substantially greater than that in said lower layer, opening the container beneath said lower layer and permitting the litter of said layers to flow freely from the container into a cat box to form upper and lower layers, respectively, in the cat box.

8. A method of filling a cat box with litter as defined in claim 7 in which the method contains the additional step of moving the container laterally as the litter flows from the container.

9. A method of filling a cat box with litter as defined in claim 7 in which said method includes the additional step of moving said container in a generally horizontal circular motion as the litter flows from the container.

10. A method of filling a cat box with litter, comprising forming upper and lower layers of litter in a container with the lower layer containing an odor suppressant in an amount substantially greater than that in said upper layer, inverting the container while it is closed, opening the inverted container at the bottom and permitting the litter of said layers to flow freely from the container into a cat box to form upper and lower layers, with the layer containing said odor suppressant being on top of the other layer.

11. A method of filling a cat box with litter as defined in claim 10 in which the method contains the additional step of moving the container laterally as the litter flows from the container.

12. A method of filling a cat box with litter as defined in claim 10 in which said method includes the additional step of moving said container in a generally horizontal circular motion as the litter flows from the container.

13. A method of filling a cat box with litter as defined in claim 10 in which said container is opened and the opening held closed until the container is inverted over the cat box and is released to permit the litter to flow into the box.

14. A prepared sanitary cat box, comprising walls and bottom forming a container, a first layer of particulate material in said container covering said bottom, and a second layer of particulate material disposed on and covering said first layer and containing an odor suppressant, said second layer having more effective odor suppressant therein than said first layer for inhibiting the escape into the atmosphere of odors from cat waste in said layers.

15. A prepared sanitary cat box as defined in claim 14 in which the thickness of said first layer is greater than the thickness of said second layer, and the two layers are disposed substantially horizontally in said container.

16. A prepared sanitary cat box as defined in claim 14 in which both of said layers consist of ground clay particles, and said odor suppressant is mixed throughout the particulate material of said second layer.

* * * * *